July 11, 1933.   W. T. CONRAD   1,917,499
AUTOMOBILE TIRE VALVE
Original Filed Feb. 14, 1928
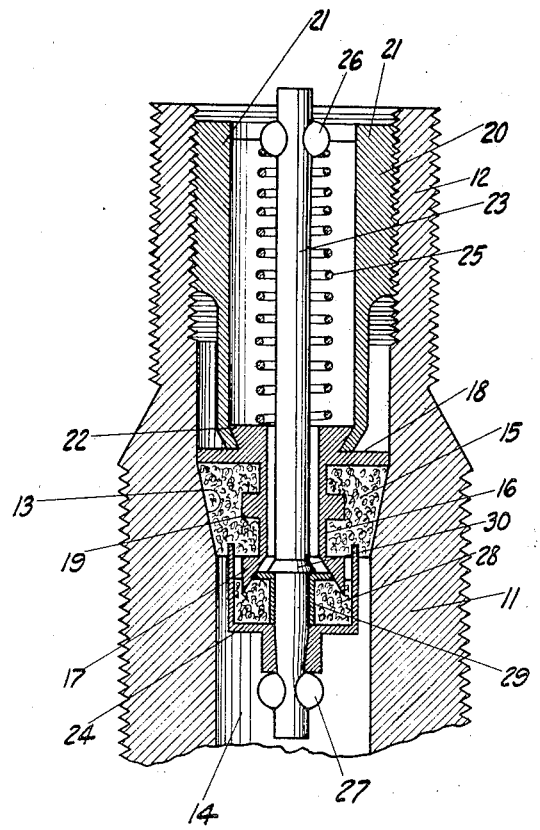
INVENTOR
William T. Conrad
BY John Flam
HIS ATTORNEY Patented July 11, 1933

1,917,499

UNITED STATES PATENT OFFICE

WILLIAM T. CONRAD, OF LAWNDALE, CALIFORNIA

AUTOMOBILE TIRE VALVE

Application filed February 14, 1928, Serial No. 254,233. Renewed May 20, 1932.

This application is a continuation in part of my prior application, Serial #154,191, filed December 11, 1926, and entitled "Automobile tire valve".

This invention relates to valves, such as are commonly used for automobile tires. These valves are arranged in a nipple fastened to the tire, and serve to check the escape of air from the tire, although permitting the entry of compressed air thereto.

It is one of the objects of my invention to provide a tire valve that has a compound sealing effect, so that the danger of losing air from the tire is minimized.

It is another object of my invention to secure these beneficial results by utilizing the usual valve rubber not only as a gasket against a tapered shoulder in the nipple, but also to act as one element for an additional valve closure. In this connection, I also make it possible to hold this valve rubber firmly in place in spite of continued use, and to urge the rubber tightly in place in the tapered shoulder without danger of it being stripped off the valve structure.

It is still another object of my invention to simplify the structure of such valves and to make it possible to assemble the valve parts expeditiously.

My invention possesses many other advantages, and has other objects which may be made more easily apparent from a consideration of one embodiment of my invention. For this purpose I have shown a form in the drawing accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawing:

The single figure is a greatly enlarged sectional view of a valve embodying my invention, and shown as in place in a tire valve nipple.

The nipple 11 is shown as of conventional form, having a reduced threaded upper portion 12 over which the usual tire valve cap can fit, in a well understood manner. This nipple projects from the inner tube, to which it is fastened, and is shown as threaded externally. It is also threaded internally for a short distance; and below the threaded portion, there is a converging tapered shoulder 13 that leads to the bore 14. Through this bore, air is arranged to be passed from a source of compressed air. A valve structure now to be described normally closes the bore 14 against escape of air outwardly from the tire.

For this purpose, use is made of a resilient gasket or plug 15, that seats onto the tapered shoulder 13. This gasket can be made from soft rubber or its equivalent, so that it can be tightly squeezed onto the shoulder to prevent escape of air between the shoulder and the gasket, and to confine the ingress and egress of air through a central aperture formed by the valve structure.

To define this central aperture, I utilize a bushing 16 of metal, over which the gasket 15 is disposed. This bushing has a lower flange 17 and an upper flange 18 between which the gasket is confined, and over which it can be readily stretched when assembling the valve. Furthermore, the bushing 16 has an intermediate flange 19 of smaller diameter, which serves, as the bushing 16 is urged inwardly as will be hereinafter described, to clamp the gasket 15 solidly against the shoulder 13, and to prevent it from thereafter being axially displaced.

The gasket 15 is urged into position by the aid of the member 20 that can be screwed into nipple 12, as by the aid of the valve cap in a well understood manner. This member 20 is tubular and has two diametrically opposite projections 21 that can be engaged by the cap to rotate it in or out of nipple 12. The lower portion of member 20 is crimped in under the extension 22 of tubular member 16, which is provided for this purpose with a slanting face. The engagement between parts 20 and 22 is loose, to permit relative rotation. In this way, the gasket 15 can be moved axially without rotating it, thus ensuring against its abrasion or other injury in the bore.

A valve stem 23 extends through bushing 16 and also through member 20. It carries the members that serve to close the central opening in the bushing, and particularly it provides a multiple sealing effect. One such effect is secured by the edge of a cup 24 carried at the end of stem 23, engaging the bottom surface of gasket 15. Thus this gasket serves a double purpose; that usually required of it, and also as a valve seat.

A spring 25 is used to urge the stem 23 to closing position, and for this purpose it is confined between the top of bushing 16 and the projections 26 near the top of rod 25. To release cup 24 from engagement with gasket 15, a downward pressure, compressing spring 25, is necessary. This is automatically accomplished by a nozzle engaging said stem when used to conduct air to the nipple 12; and stem 23 is for this purpose extended above the nipple 12.

The cup 24 can be fastened to the stem 23 as by driving it on a tapered portion of the stem, and by the aid of the projections 27 that are formed by upsetting.

In order to form a double seal, the cup 24 carries a closure member 28 of rubber, which cooperates with the tapered edge of flange 17. Thus for air to leak from bore 14 through the tubular member 16, it must creep not only upwardly past the edge of cup 24, but thereafter downwardly past the edge of flange 17. In this way, a tortuous passageway for any escaping air is provided, which is so difficult to traverse that very little air escapes even after continued long use, and even if the automobile is driven over rough roads.

The closure 28 is retained in place by the aid of a flanged sleeve 29. The flange rests over the closure, and the sleeve part is placed on stem 23 and into closure 28. The stem 23 carries a narrow flange 30 that engages the sleeve flange. This flange 30 is small enough in diameter to pass through bushing 16. An important function of the flange on sleeve 29 is to act as a stop against too great an embedding of cup 24 in gasket 15, as well as of flange 17 in closure 28. This stop function is secured by the edge of the flange contacting with the interior tapered surface of flange 17, limiting the upward axial movement of stem 23 and its associated parts. Without this precaution, the rubber parts may be seriously injured.

It is evident that I have developed a simple and compact valve structure, capable of use in standard nipples, and that can keep the air in the tires for a long period.

I claim:

1. In a tire valve construction arranged to coact with a tire valve nipple having an internal tapered shoulder, a threaded body member arranged to be screwed into said nipple, an extension for said member, a bushing having a grooved flange, the extension engaging said groove so as to permit said bushing to rotate with respect to the extension, said bushing having a pointed flange at the bottom, a resilient gasket disposed on said bushing between the flanges and arranged to coact with the tapered shoulder, said bushing also having an intermediate flange to serve as a support for the gasket, a valve stem extending through the bushing, a cup on said stem having its edge arranged to coact with the bottom of the gasket to serve as a closure, a resilient closure member in the cup coacting with the pointed flange to provide another closure, a sleeve in said closure member cooperating with the pointed flange to limit their relative axial movement, and resilient means for urging the stem to closing position.

2. In a tire valve construction arranged to coact with a tire valve nipple having an internal tapered shoulder, a threaded body member arranged to be screwed into said nipple, an extension for said member, a bushing having a grooved flange, the extension engaging said groove so as to permit said bushing to rotate with respect to the extension, said bushing having another flange at the bottom, a resilient gasket disposed on said bushing between the flanges and arranged to coact with the tapered shoulder, a valve stem extending through the bushing, a cup on said stem having its edge arranged to coact with the bottom of the gasket to serve as a closure, a closure member in the cup coacting with the bottom flange on the bushing to provide another closure, and resilient means for urging the stem to closing position.

In testimony whereof I have hereunto set my hand.

WILLIAM T. CONRAD.